Patented Nov. 11, 1952

2,617,738

UNITED STATES PATENT OFFICE 2,617,738

PLASTICIZED AND STABILIZED CELLULOSE PROPIONATE

William B. Horback, Irvington, Edward J. Wickson, South Orange, and William J. Myles, Summit, N. J., assignors to Celanese Corporation of America, New York, N. Y., a corporation of Delaware No Drawing. Application November 10, 1949, Serial No. 126,691

2 Claims. (Cl. 106—179)

This invention relates to thermoplastic compositions and relates more particularly to thermoplastic compositions having a basis of cellulose propionate.

An important object of this invention is the provision of thermoplastic compositions having a basis of cellulose propionate that have superior physical properties and are especially adapted for the production of fountain pens.

A further object of this invention is to provide thermoplastic compositions having a basis of cellulose propionate plasticized with methoxyethylstearate.

Another object of this invention is the provision of thermoplastic compositions having a basis of cellulose propionate plasticized with methoxyethylstearate and containing paracyclohexyl phenol as a stabilizer.

Other objects of this invention will be apparent from the following detailed description and claims.

We have discovered that thermoplastic cellulose propionate compositions having superior physical properties may be prepared by incorporating methoxyethylstearate in cellulose propionates having from about 0.2 to 0.4 free hydroxyl groups per glucose unit. The methoxyethylstearate, which may be present in an amount of from about 2.5 to 35% by weight or more based on the weight of the cellulose propionate, functions as a plasticizer and the thermoplastic cellulose propionate compositions containing the same may be employed in the form of films or foils, or in the form of a coating composition, or as a molding powder for the production of molded or extruded articles. The novel thermoplastic cellulose propionate compositions of our invention are resistant to blushing, have a low water and ink absorption, good dimensional stability, low weight loss on heating, and good impact strength and are especially adapted for the production of fountain pens.

The cellulose propionate compositions may advantageously contain, in addition to the methoxyethylstearate, a small proportion of paracyclohexyl phenol. The paracyclohexyl phenol, which may be present in an amount of from about 0.05 to 2% by weight based on the weight of the cellulose propionate, acts as a viscosity stabilizer, reducing the viscosity loss that normally occurs when the cellulose propionate compositions are subjected to elevated temperatures as, for example, during molding or extrusion operations, or when articles produced from the cellulose propionate compositions are employed in surroundings having a high temperature.

Where our novel compositions are to be employed as molding powders for the production of injection or compression moldings, or for extrusion operations, the molding powders may be prepared in a manner well known in the art. For example, the cellulose propionate is mixed with the methoxyethylstearate, which may have dissolved therein the paracyclohexyl phenol, and the mixture passed repeatedly through the nip of heated malaxating rolls until it is rendered homogeneous. The mixture is taken off the malaxating rolls in the form of thin sheets, cooled and then broken into particles of a convenient size for use in molding and extrusion devices.

For the production of films and foils, cellulose propionate having from about 0.2 to 0.4 free hydroxyl groups per glucose unit, together with the desired amounts of methoxyethylstearate and paracyclohexyl phenol, may be dissolved in a solvent or solvent mixture and the resulting solution deposited on a casting surface. Upon removal of the solvent or solvent mixture, the films or foils set and may be readily stripped from the casting surface.

The thermoplastic cellulose propionate compositions of this invention may have incorporated therein pigments, dyes, nacreous materials and other substances having a decorative effect. They may also contain ultra-violet light absorbing materials, fire retardents and the like.

The following examples are given to illustrate this invention further.

Example I

A thermoplastic composition containing 100 parts by weight of a cellulose propionate having 0.3 free hydroxyl groups per glucose unit and 14.1 parts by weight of methoxyethylstearate is tested for tensile strength in accordance with A. S. T. M. test D–759. The composition exhibits a yield stress of 2250 pounds per square inch, a breaking stress of 2340 pounds per square inch, a tensile stress of 2380 pounds per square inch, and an elongation of 57%, all of which are higher than the properties exhibited by other commercially available cellulose propionate compositions having a comparable content of plasticizer.

Example II

A thermoplastic composition containing 100 parts by weight of a cellulose propionate having 0.3 free hydroxyl groups per glucose unit and 16.1 parts by weight of methoxyethylstearate is tested for shrinkage in accordance with A. S. T. M. test D–756–44T. The composition exhibits a shrinkage of 0.24% and 0.36% after one and two cycles, respectively, which is only about two-thirds as large as the shrinkage exhibited by other commercially available cellulose propionate compositions having a comparable content of plasticizer. After the second cycle, the cellulose propionate composition exhibits no signs of exudation or blushing.

During the same test, the straight line warpage, in twentieths of an inch, is determined by measurements along a 10 inch length of the test specimen and found to be 1.3 and 1.0 after one and two cycles, respectively. This is less than about one-half as large as the straight line warpage exhibited by other commercially available cellulose propionate compositions having a comparable content of plasticizer.

The out of plane warpage, in sixteenths of an inch, is determined during the same test by placing three corners of the test specimen on a plane and measuring the height of the fourth corner from said plane. The out of plane warpage was found to be 0.5 after both the first and second cycles, whereas other commercially available cellulose propionate compositions having a comparable content of plasticizer have about twice this out of plane warpage after the second cycle.

*Example III*

A molded thermoplastic composition containing 100 parts by weight of a cellulose propionate having 0.3 free hydroxyl groups per glucose unit and 15 parts by weight of methoxyethylstearate is conditioned for one week at a temperature of 77° F. and 50% relative humidity, immersed for two weeks in writing ink at 120° F., and conditioned for one week at a temperature of 77° F. and 50% relative humidity. The composition exhibits an increase in weight of 0.66%, which is only about two-thirds as large as the increase in weight exhibited by other commercially available cellulose propionate compositions having a comparable plasticizer content.

*Example IV*

A thermoplastic composition containing 100 parts by weight of a cellulose propionate having 0.3 free hydroxyl groups per glucose unit, 15 parts by weight of methoxyethylstearate, and 0.25 parts by weight of paracyclohexyl phenol is converted into a molding powder and aged for 80 days at 140° F. The aged powder is molded into discs at a temperature of 392° F. The material in the molded disc has a viscosity in acetone-water (98:2) of 46 centipoises, whereas in the absence of the paracyclohexyl phenol, the viscosity of the material is only 13 centipoises.

It is to be understood that the foregoing detailed description is given merely by way of illustration and that many variations may be made therein without departing from the spirit of our invention.

Having described our invention, what we desire to secure by Letters Patent is:

1. A thermoplastic composition consisting of 100 parts by weight of cellulose propionate, 15 parts by weight of methoxyethylstearate and 0.5 part by weight of paracyclohexyl phenol as stabilizer for the cellulose propionate.

2. A thermoplastic composition consisting of 100 parts by weight of cellulose propionate containing about 0.2 to 0.4 free hydroxyl groups per glucose unit, 15 parts by weight of methoxyethylstearate and 0.5 part by weight of paracyclohexyl phenol as stabilizer for the cellulose propionate.

WILLIAM B. HORBACK.
EDWARD J. WICKSON.
WILLIAM J. MYLES.

REFERENCES CITED

The following references are of record in the file of this patent:

UNITED STATES PATENTS

| Number | Name | Date |
|---|---|---|
| 2,261,140 | Conklin | Nov. 4, 1941 |
| 2,410,685 | Salo | Nov. 5, 1946 |

FOREIGN PATENTS

| Number | Country | Date |
|---|---|---|
| 440,364 | Great Britain | Dec. 30, 1935 |